United States Patent
Link (10) Patent No.: US 9,831,968 B2
(45) Date of Patent: Nov. 28, 2017

(54) DIGITAL SWITCHING SIGNAL SEQUENCE FOR SWITCHING PURPOSES, APPARATUS FOR INCLUDING SAID DIGITAL SWITCHING SIGNAL SEQUENCE IN A DIGITAL AUDIO INFORMATION SIGNAL, AND APPARATUS FOR RECEIVING THE INFORMATION SIGNAL PROVIDED WITH THE SWITCHING SIGNAL SEQUENCE

(75) Inventor: Martin Link, Gauting (DE)

(73) Assignee: INSTITUT FÜR RUNDFUNKTECHNIK GMBH, Munich (DE)

( * ) Notice: Subject to any disclaimer, the term of this patent is extended or adjusted under 35 U.S.C. 154(b) by 607 days.

(21) Appl. No.: 14/236,981

(22) PCT Filed: Aug. 1, 2012
(Under 37 CFR 1.47)

(86) PCT No.: PCT/EP2012/065079
§ 371 (c)(1),
(2), (4) Date: Feb. 4, 2014

(87) PCT Pub. No.: WO2013/020879
PCT Pub. Date: Feb. 14, 2013

(65) Prior Publication Data
US 2014/0169591 A1    Jun. 19, 2014

(30) Foreign Application Priority Data
Aug. 5, 2011  (IT) .............................. TO2011A0731

(51) Int. Cl.
*H03G 3/32*    (2006.01)
*H04H 20/26*   (2008.01)
(Continued)

(52) U.S. Cl.
CPC .......... *H04H 20/26* (2013.01); *H04N 21/233* (2013.01); *H04N 21/4383* (2013.01); *H04N 21/4394* (2013.01); *H04N 21/6543* (2013.01)

(58) Field of Classification Search
CPC ....................................................... H03G 3/32
(Continued)

(56) References Cited

U.S. PATENT DOCUMENTS 2,766,374 A   10/1956  Hoffmann
3,845,391 A   10/1974  Crosby
(Continued)

FOREIGN PATENT DOCUMENTS

DE    3801332 A1   7/1989
EP    1 439 736 A1  7/2004
(Continued)

OTHER PUBLICATIONS

International Preliminary Report on Patentability dated Feb. 11, 2014, issued in PCT Application No. PCT/EP2012/065079, filed Aug. 1, 2012.
(Continued)

*Primary Examiner* — Paulos M Natnael
(74) *Attorney, Agent, or Firm* — Workman Nydegger (57) ABSTRACT

A digital switching signal sequence is realized as a previously digitized, high-pass filtered white noise signal of a predetermined length T, with a high-pass cut-off frequency which lies above the frequency where the loudness threshold characteristic in silence of the human hearing has its highest sensitivity, if possible. The switching signal sequence is employed for switching purposes (206), e.g., for switching between two information signals (201, 207).

11 Claims, 5 Drawing Sheets

(51) Int. Cl.
*H04N 21/233* (2011.01)
*H04N 21/438* (2011.01)
*H04N 21/439* (2011.01)
*H04N 21/6543* (2011.01)

(58) Field of Classification Search
USPC ........ 348/738, 705, 706, 500, 515; 381/123, 381/94.1–94.9; 375/286, 287, 293, 355, 375/364–368, 354
See application file for complete search history.

(56) References Cited

U.S. PATENT DOCUMENTS

| | | | | |
|---|---|---|---|---|
| 4,379,947 | A * | 4/1983 | Warner | H04H 20/34 370/204 |
| 4,398,224 | A * | 8/1983 | Watanabe | G11B 20/10527 386/264 |
| 5,042,030 | A * | 8/1991 | Grima | H04L 12/4637 370/358 |
| 5,777,909 | A * | 7/1998 | Leung | H03H 17/02 708/300 |
| 6,141,426 | A | 10/2000 | Stobba et al. | |
| 6,356,220 | B1 * | 3/2002 | Takatsu | H03M 1/1215 341/137 |
| 6,437,870 | B1 * | 8/2002 | Yoshida | H04N 1/33307 358/1.15 |
| 6,466,631 | B1 * | 10/2002 | Schenk | H04L 25/03057 375/232 |
| 2002/0172374 | A1 * | 11/2002 | Bizjak | H03G 3/3089 381/71.14 |
| 2002/0172376 | A1 * | 11/2002 | Bizjak | H03G 3/3089 381/94.3 |
| 2005/0097154 | A1 * | 5/2005 | Tsecouras | H04B 15/00 708/300 |
| 2005/0201574 | A1 * | 9/2005 | Lenhardt | A61H 23/0245 381/151 |
| 2008/0170730 | A1 * | 7/2008 | Azizi | G01S 5/186 381/310 |
| 2010/0102895 | A1 * | 4/2010 | Beukema | H04L 27/0008 332/103 |
| 2013/0100884 | A1 * | 4/2013 | King | H04W 88/16 370/328 |
| 2014/0362047 | A1 * | 12/2014 | Ahn | G06F 3/0416 345/174 |

FOREIGN PATENT DOCUMENTS

| | | |
|---|---|---|
| JP | S61/501544 | 7/1986 |
| JP | H01-294271 | 11/1989 |
| JP | H11-187310 | 7/1999 |
| JP | H11-327591 | 11/1999 |
| RU | 2 214 047 C2 | 10/1999 |
| UA | 26980 C1 | 2/2000 |
| WO | 85-04298 A1 | 9/1985 |

OTHER PUBLICATIONS

International Search Report and Written Opinion dated May 15, 2012, issued in Italian Application No. TO2011A000731, filed Aug. 5, 2011.

International Search Report dated Dec. 11, 2012, issued in PCT Application No. PCT/EP2012/065079, filed Aug. 1, 2012.

* cited by examiner

DIGITAL SWITCHING SIGNAL SEQUENCE FOR SWITCHING PURPOSES, APPARATUS FOR INCLUDING SAID DIGITAL SWITCHING SIGNAL SEQUENCE IN A DIGITAL AUDIO INFORMATION SIGNAL, AND APPARATUS FOR RECEIVING THE INFORMATION SIGNAL PROVIDED WITH THE SWITCHING SIGNAL SEQUENCE

INTRODUCTION TO THE DESCRIPTION

The invention relates to a digital switching signal sequence for switching purposes, an apparatus for including the switching signal sequence in a digital information signal and an apparatus for receiving an information signal provided with the switching signal sequence.

A first case of application is the capability of remote-controlling the change of the broadcasting service at the beginning or end of a shared night program. Crossfading is intended to follow the contents of the program. However, crossfading is to be fixed by the station broadcasting. Since the different signal propagation times of audio and switching signals cannot be exactly detected at present, no precise crossfading or switching is possible in this way.

The invention intends to suggest a switching signal that comprises better properties than switching signals employed up to now and that determines the point in time of switching more precisely.

It is suggested according to the invention to take, as a switching signal sequence, a digitized highpass filtered white noise signal of a predetermined length. By the highpass cut-off frequency of this noise signal lying above the frequencies where the loudness threshold characteristic in silence of human hearing has its highest sensitivity, this switching signal sequence is completely inaudible even without the presence of an information signal. In the transmission simultaneous with the information signal, its masking effect is utilized by correspondingly increasing the level of the switching signal sequence so that the information signal acting as interfering signal for signaling does not become too strong relatively seen.

BRIEF DESCRIPTION OF THE FIGURES

The invention will be further illustrated with reference to the description of the figures. In the drawing.

DESCRIPTION OF THE FIGURES

A highpass filtered white noise signal of time length T is employed as a digital switching signal sequence. This thus determined digital signal pattern is "concealed" in an information signal. As is already known from source encoding, the benefit of lower frequency proportions is much too low in terms of data communication in relation to the efforts when the masking effects of human hearing are utilized. It showed that a simple adaptation of the amplitude of the switching signal sequence to the level characteristic of the information signal is sufficient to avoid audible noise components and simultaneously maintain sufficient signal strength to detect the switching signal sequence.

Figure 10:
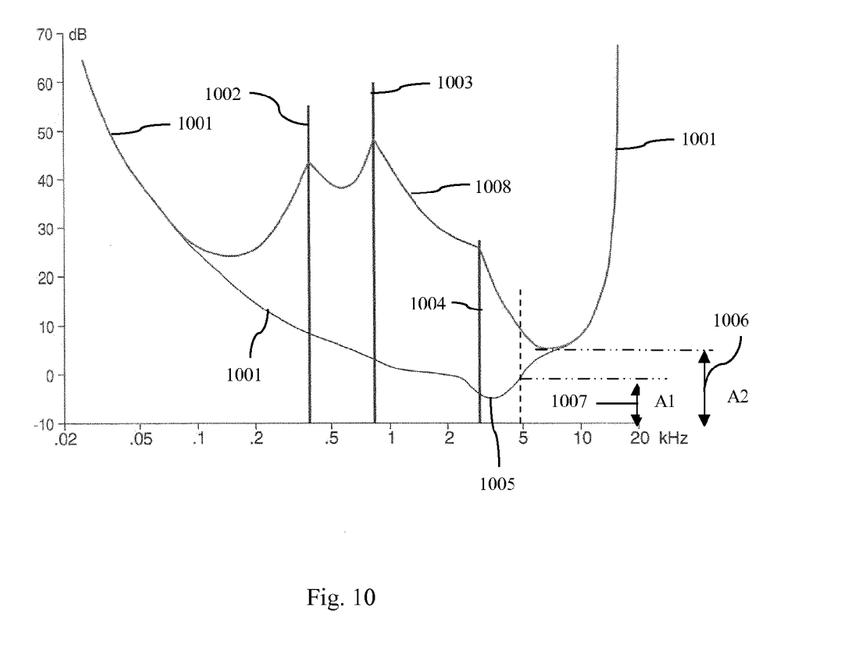
FIG. 10 shows a frequency diagram with the loudness threshold characteristic in silence and the masked threshold.

FIG. 10 shows a frequency diagram with the loudness threshold characteristic in silence of human hearing, the line being indicated with reference numeral 1001. This curve has a minimum 1005 approx. at 3.5 kHz. The (lower) cut-off frequency of the highpass filtered white noise signal is above said 3.5 kHz.

In one embodiment, the cut-off frequency is in a frequency range between 4 and 10 kHz. To possibly obtain better results in the detection, it is suggested to preferably select the cut-off frequency to be between 6 and 8 kHz. FIG. 10 furthermore shows how the threshold of audibility of human hearing changes under the influence of a present information signal, in this case three sinusoidal sounds 1002, 1003 and 1004. The threshold of hearing is increased in the frequency range between approx. 100 Hz and 8 kHz, as indicated by curve 1008. This in turn has an influence on the amplitude of the switching signal sequence, that means that the amplitude of the switching signal sequence can be increased as the amplitudes of the information signal increase. This is further illustrated in FIG. 10 by reference numerals 1006 and 1007. Here, it is assumed that the lower cut-off frequency of the switching signal sequence is approx. 5 kHz. If the information signal is absent, an amplitude equal to A1, indicated by 1007, is possible for the switching signal sequence, as this amplitude does not exceed the loudness threshold characteristic in silence at 5 kHz. If the information signal is present, the amplitude of the switching signal sequence can be increased up to A2, see reference numeral 1006. The threshold frequency should thus not fall below 4 kHz as otherwise the property of the loudness threshold characteristic in silence is not optimally utilized. Then, one must rely on the masked threshold or the dynamic reserve (the "place" underneath the loudness threshold characteristic in silence) of the transmission path.

With the aid of a signal pattern of the switching signal sequence stored in the receiver, an incoming continuous information signal is to be examined for the occurrence of this pattern. As soon as this pattern is found, a control signal is to be emitted.

For the detection of this pattern, the so-called cross correlation function of the incoming signal is formed with the pattern function of the digital switching signal sequence stored at the receiver. For this, the level of the incoming signal is preferably previously leveled such that the level adaptations of the switching signal sequence necessary in merging are largely undone. Otherwise, the signal proportions with the noisiest components would dominate and render detection ineffective.

Highpass filtering must preferably not comprise any high rate of rise in order not to affect the peak of the cross correlation function. For in filters with steep rates of rise, the ripple ("filter ringing") has disadvantageous effects on a clear detection of the maximum.

Figure 1:
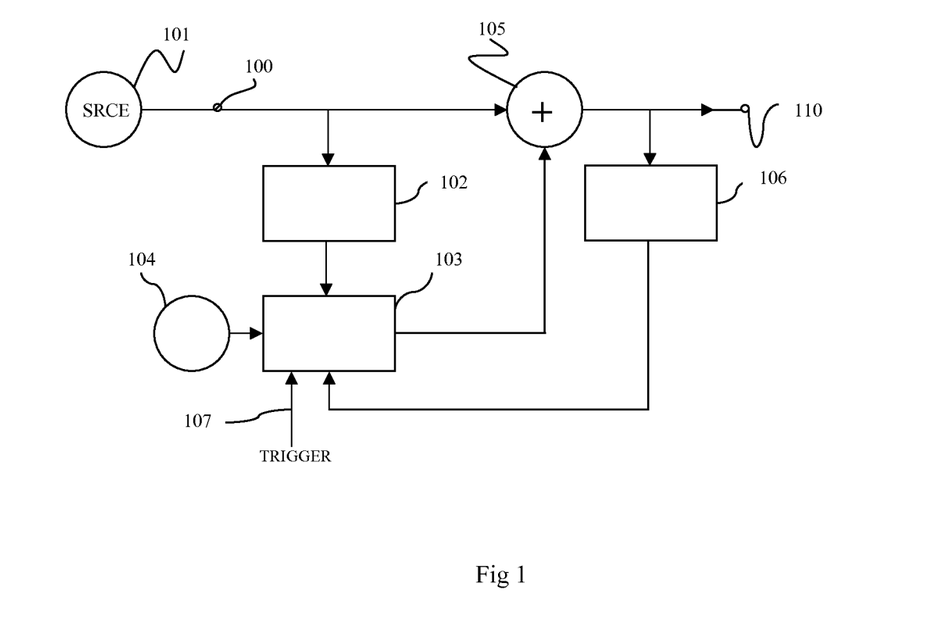
FIG. 1 shows an embodiment of an apparatus for including the switching signal sequence in a digital information signal.

FIG. 1 shows a first embodiment of an apparatus for including the switching signal sequence in a digital information signal. The information signal is offered by an information signal source 101 at an input 100 of the apparatus. The input 100 is coupled with the input of a combination circuit 105 as well as with the input of an envelope detector 102. An output signal of the envelope detector 102 activates a level control circuit 103. The apparatus is provided with a switching signal sequence generator 104 which supplies a switching signal sequence to an input of the level control circuit 105. An output signal whose level is amplified in response to the output signal of the envelope detector 102 is offered to the combination circuit 105 at a moment that is determined by a trigger moment 107. Of course, the trigger moment is selected such that, when a switching signal sequence is introduced into the information signal at this moment, it initiates a switching function at the right moment when it is detected in a receiver. The information signal provided with the switching signal sequence is then offered at an output 110 for transmission to a receiver.

A supervision circuit 106 is provided and equipped with a detection means 106 for detecting the switching signal sequence contained in the information signal.

The level control circuit 103 amplifies the amplitude of the switching signal sequence in response to the control signal of the control circuit 102 such that, as the envelope of the information signal is getting larger, the amplitude of the switching signal sequence is accordingly increased. The combination circuit 105 can be designed such that it adds the successive digital signal values of the information signal and the switching signal sequence.

Figure 2:
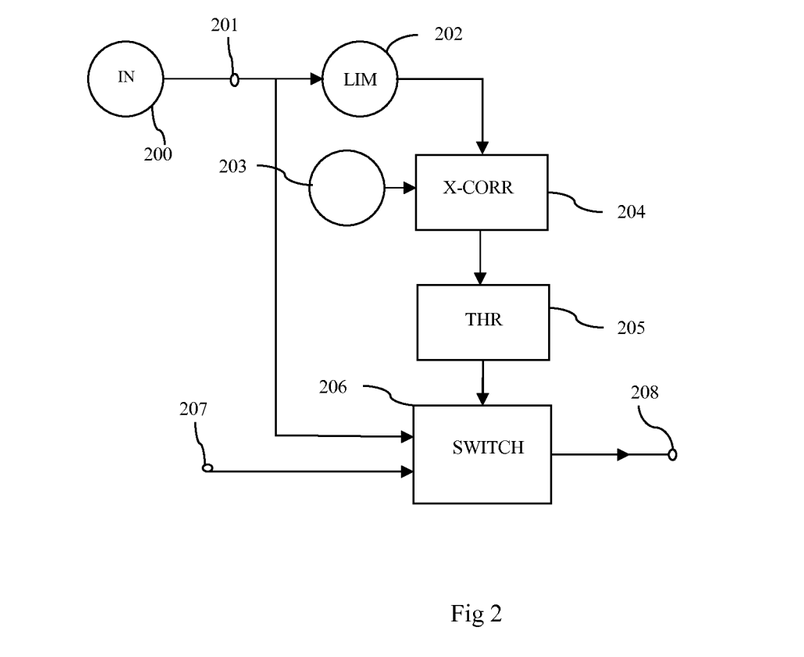
FIG. 2 shows an embodiment of an apparatus for receiving an information signal provided with a digital switching signal sequence, generated according to the apparatus according to FIG. 1.

FIG. 2 shows a receiver for receiving, via the input 201, the information signal 200 generated by the apparatus according to FIG. 1 and provided with the switching signal sequence. The input 201 is coupled to an input of a limiter 202 and to a first input of a switch 206. A second information signal is offered at the switch 206 via an input 207. An output of the limiter 202 is coupled to an input of a cross correlation detector 204. A fixed pattern 203 of the switching signal sequence stored in the apparatus is offered at another input of the cross correlation detector 204. An output of the detector 204 is coupled to an input of a threshold circuit 205. An output of the threshold circuit 205 is coupled at a control input of the switch 206. An output of the switch 206 is coupled to an output 208 of the receiver. In a first situation, the switch 206 is set such that the information signal offered at the input 201 is transferred at the output 208.

Figure 5:
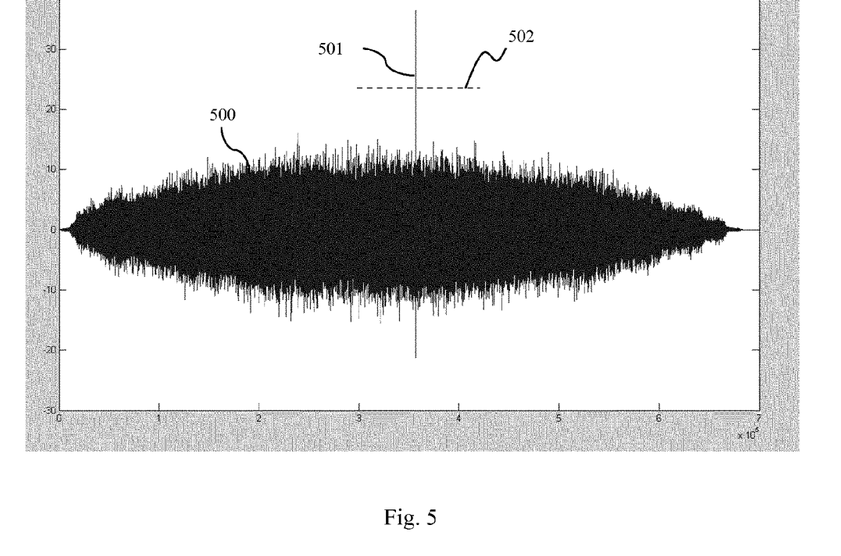
FIG. 5 shows the cross correlation signal as a result of a cross correlation between the information signal and a version of the digital switching signal sequence stored in the detector circuit of the receiver, FIG. 6 schematically shows a second embodiment with the digital switching signal sequence in accordance with the invention, FIG. 7 schematically shows a third embodiment with the digital switching signal sequence in accordance with the invention.

The limiter 202 takes care that the input signal 200 is leveled in the amplitude, so that noisy and quiet passages in the information signal and thus in the switching signal sequence are transferred to the cross correlation circuit 204 at constant levels. In this circuit, a cross correlation occurs between the limited information signal offered at the first input and the fixed pattern of the switching signal sequence offered at the second input. FIG. 5 shows what the output signal of the cross correlation circuit 204 can look like if this pattern is exactly cross-correlated with the switching signal sequence contained in the information signal. The 700,000 samples on the X-axis approximately correspond to a playing time of about 14 seconds.

It is apparent that a very narrow peak 501 with an essentially greater amplitude than the rest of the output signal of the cross correlation circuit 204 is generated. In the threshold circuit 205, a threshold 502 is present (see FIG. 5). When this threshold is exceeded, a detection signal is generated at the output of the threshold circuit 205 and offered at the switch 206. In response to this detection signal, the switch 206 switches over, so that the second information signal offered at the input 207 is transferred to the output 208. By the peak being sufficiently narrow, a very precise switching time can be achieved.

In another embodiment of the receiver of FIG. 2, the block 206 is designed differently, namely as a synchronizing circuit for synchronizing the two information signals. The first information signal offered at the input 200 is in turn a digital audio signal. The second information signal is e. g. a digital video signal. The audio signal is part of the video signal, however, it is not correctly synchronized with the video signal. The switching signal sequence is included at such a position in the first information signal that it serves as a synchronization point with respect to the corresponding second information signal. Upon detection of the switching signal sequence in the first information signal, the threshold circuit 205 generates such a control signal, whereby the two information signals are synchronized in block 206.

Figure 3:
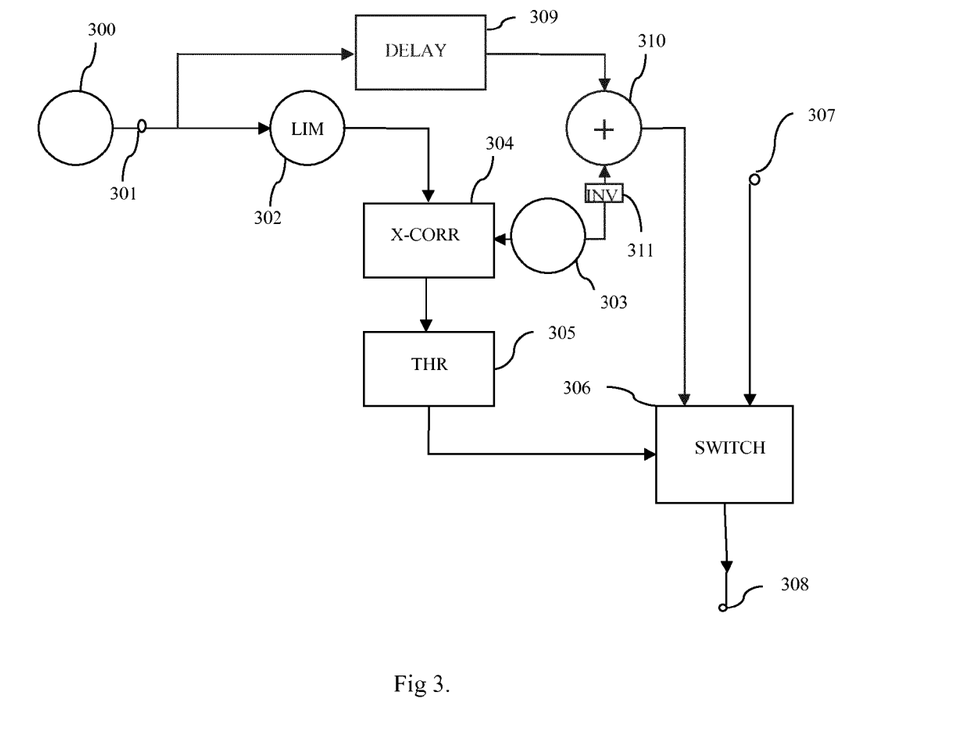
FIG. 3 shows a second embodiment where the receiver is able to remove the switching signal sequence from the audio signal, FIG. 4 schematically shows a first embodiment of the digital switching signal sequence in accordance with the invention.

FIG. 3 shows a second embodiment of the receiver for receiving. Via an input 301, the information signal 300 provided with the switching signal sequence and generated by the apparatus according to FIG. 1 is in turn transferred to the apparatus. The input 301 is coupled to an input of a limiter 302 and to a first input of a switch 306. A second information signal is offered at the switch 306 via an input 307. An output of the limiter 302 is coupled to an input of a cross correlation detector 304. At another input of the cross correlation detector 304, a fixed pattern 303 of the switching signal sequence stored in the apparatus is offered. An output of the detector 304 is coupled to an input of a threshold circuit 305. An output of the threshold circuit 305 is coupled to a control input of the switch 306. An output of the switch 306 is coupled to an output 308 of the receiver. The function of this receiver with respect to the detection of the switching signal sequence and the switching between the two information signals is identical to that of the apparatus of FIG. 2. The apparatus in FIG. 3 is furthermore provided with a delay unit 309 which transfers the information signal received via the input 310 with some delay to an input of an adding circuit 301. The switching signal pattern 303 stored in the apparatus is also supplied to the adding circuit 310, after a signal inversion in an inverter 311. Of course, it speaks for itself that the combination of the inverter circuit 311 and the adding circuit 310 could also have been designed as a subtracting circuit.

The mode of operation of the adding circuit 310 and the inverter circuit 311 is such that in a detection of a switching signal sequence in the first information signal, the inverter circuit 311 is controlled such that an inverted switching signal sequence is supplied at the adding circuit 310 at the right moment, and thereby the switching signal sequence is cancelled in the information signal, so that an information signal freed from the switching signal sequence can be offered at the switch 306. The delay time of the delay circuit 309 thus equals the time required to detect the switching signal sequence in the information signal and to provide a signal pattern at the second input of the adding circuit 310.

Figure 4:
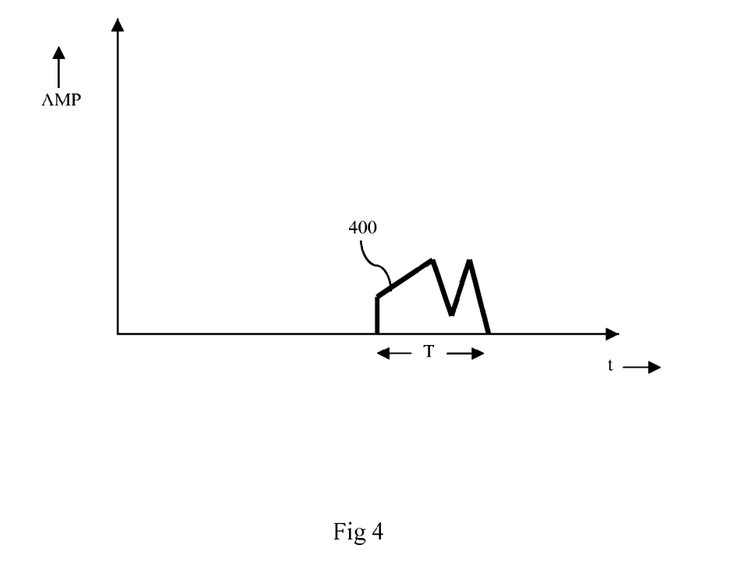

FIG. 4 shows actually only very schematically (and not truthfully) how a switching signal sequence of length T is stored in the memory 104 in FIG. 1. Actually, the switching signal sequence is a white noise signal. For the further description, a correct drawing of a white noise signal would not be suited as in the further description, amended switching signal sequences are suggested. For example, an array of N switching signal sequences can be included in the information signal, wherein N≥2. For example, FIG. 6 shows how, in another embodiment of the apparatus according to FIG. 1, (N=) two switching signal sequences 600 and 601 are generated one after the other in the time by the generator 104 and are included by the combination circuit 105 in the information signal.

Figure 6:
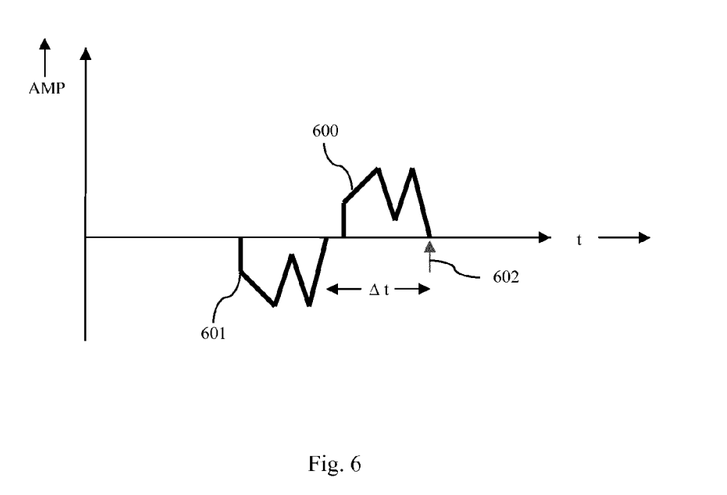

Thus, the reliability of detection is increased for the following reasons:

Supposed in the reception of a switching signal sequence according to FIG. 4, the switching control signal is generated at the point in time indicated by arrow 602 in FIG. 6. In the embodiment according to FIG. 6, in the cross correlation circuit 204 or 304, respectively, first a negative peak is generated because the inverted switching signal sequence 601 is to be received and detected first. Only after this, the switching signal sequence 600 is received and a positive peak is generated. If thus a negative peak results, this is to be delayed by the period Δt to trigger the switching signal; if a positive peak results, it triggers the switching signal immediately. The compute-bound cross correlation is here utilized twice. The increase in reliability consists in that the desired switching operation is signaled redundantly (doubly).

For example, the inverted switching signal sequence comes (Δt=) 5 seconds before the switch point, so the receiver can clearly trigger the switching operation. It simply delays the negative correlation peak by 5 seconds. The positive peak immediately leads to the switching operation. With this trick, namely to repeat the switching signal sequence invertedly, one doubles detection reliability by the thus double length of the switching signal sequence (which equals the sum of the length of the switching signal sequence plus the length of the inverted switching signal sequence) without any additional efforts in the cross correlation circuit.

This approach can be expanded if even higher detection reliability is required. The pattern signal is divided in time e.g. into two halves and the cross correlation is also calculated with the two parts, and for detecting the pattern, both proportions are simply added. As it is now possible to also transmit the two parts individually in an inverted state, that means reversed by 180 degrees, four possibilities result (the two signal parts with their two variants 0 degree and 180 degrees represent two data bits!).

Figure 7:
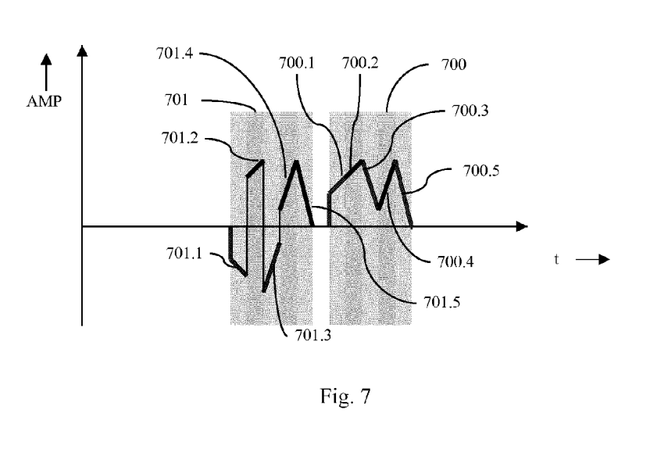

By the subdivision into M subsequences (wherein M≥2), one can generate a bit pattern within the switching signal sequence. The calculation of the cross correlation from time segments of the switching signal sequence is hardly any more complicated than the calculation in one step. A switching signal sequence lasting, for example, 5 seconds is formed from five individual subsequences of a duration of 1 second each, the first subsequence naturally being 4 seconds before the switching pulse, the second one 3 seconds before it, etc., see FIG. 7. FIG. 7 shows two switching sequences 700 and 701 which are both subdivided into (M=) five subsequences 700.1 to 700.5 and 701.1 to 701.5, respectively. In the switching sequence 701, the sequence parts 701.1 and 701.3 are inverted.

It should be noted at this point that e.g. also in the fast convolution, such segmenting is effected if the pattern signal is longer than the selected window length for the frequency transformation. The fast convolution is an algorithm for calculating the convolution via the Fast Fourier Transformation (FFT) to save computing power. If in summing up for achieving the correlation signal, not only the positive subsignals, but also the inverted variants are used, one obtains, without any considerable additional efforts, 2×2× 2×2×2, i.e. 32 correlation signals, and one can transmit 5 bits corresponding to the polarity of the sent subpatterns. Thus, the switching signals can be transmitted 31 times in advance in the example because they can be distinguished and therefore associated to one and the same switching time in the decoder. This renders operation very reliable, for switching is even effected if only one of the altogether 32 signal patterns is identified without the computing efforts being remarkably higher compared to the correlation with only one of the pattern functions. This is further illustrated with reference to FIG. 8.

If propagation time is possible from this point of the signal path, the signal pattern can be admixed in an inverted state to the program signal delayed by its duration and even be removed again in this manner. Then, a shorter pattern signal with a lower requirement on inaudibility can also be used. The transmission with source encoding restricts the possibility of cancelling because the source encoder produces quantizing noise also from the pattern signal, resulting in a lower "representation" of the pattern signal and not being known to the receiver, depending on the adjusted data rate.

Figure 8:
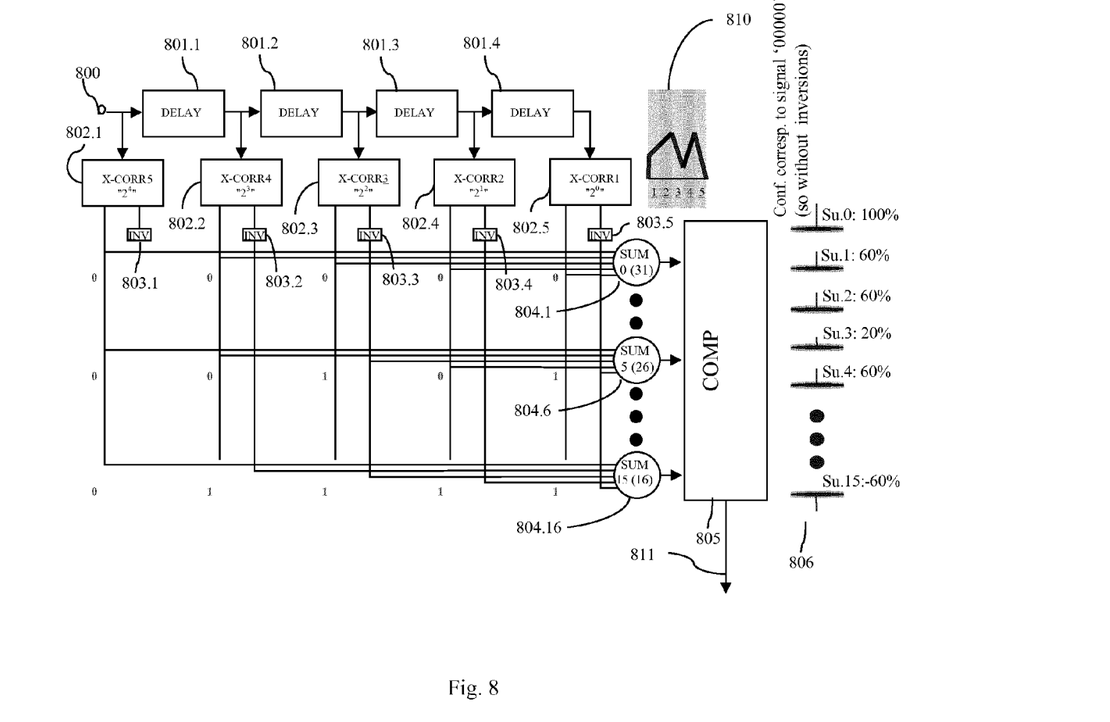
FIG. 8 shows an embodiment with another detector circuit.

FIG. 8 shows another embodiment of the cross correlation circuit 204 and 304 of FIGS. 2 and 3, respectively. Here, cross correlation with five subtotals is performed. The cross correlation circuit in FIG. 8 contains four delay lines 801.1 to 801.4. At the input 800, the information signal provided with the switching signal sequence is supplied. With five delay lines 801, the delay time of each line is T/5, T being the length of one switching signal sequence. Five cross correlation circuits 802.1 to 802.5 exist. The input of the cross correlation circuit 802.1 is coupled to the input 800. Inputs of the cross correlation circuits 802.2 to 802.5 are coupled to respective outputs of the delay circuits 801.1 to 801.4. The cross correlation circuit contains the adders 804.1 to 804.16. Adder 804.1 has five inputs coupled to the outputs of the cross correlation circuits 802.1 to 802.5 (see binary number 00000 in FIG. 8). Adder 804.2 (not depicted) has five inputs, one of which is coupled to an inverted output 803.5 of the cross correlation circuit 802.5, and the other four inputs are coupled to the outputs of the cross correlation circuits 802.1 to 802.4 (binary number 00001, not shown in FIG. 8). Adder 804.3 (not depicted) has five inputs one of which is coupled to an inverted output 803.4 of the cross correlation circuit 802.4, and the other four inputs are coupled to the outputs of the cross correlation circuits 802.1 to 802.3 and 802.5 (binary number 00010, not shown). Adder 804.4 (not depicted) has five inputs two of which are coupled to the inverted outputs 803.4 and 803.5 of the cross correlation circuits 802.4 and 802.5, respectively, and the other three inputs are coupled to the outputs of the cross correlation circuits 802.1 to 802.3 (binary number 00011, not shown). Adder 804.5 (not depicted) has five inputs one of which is coupled to an inverted output 803.3 of the cross correlation circuit 802.3, and the other four inputs are coupled to the outputs of the cross correlation circuits 802.1, 802.2, 802.4 and 802.5 (binary number 00100, not shown). Adder 804.6 has five inputs two of which are coupled to the inverted outputs 803.3 and 803.5 of the cross correlation circuits 802.3 and 802.5, respectively, and the other three inputs are coupled to the outputs of the cross correlation circuits 802.1, 802.2, and 802.4 (see binary number 00101 in FIG. 8).

This type of couplings between the inputs of the adders and the outputs or inverted outputs of the cross correlation circuits 802.1 to 802.5 is performed further with the adder 804.7 (not depicted) to the adder 804.16. This means that the five inputs of the adder 804.7 (not depicted) are coupled with the inputs of the cross correlation circuits 802.1, 802.2 and 802.5, and the inverted inputs 803.3 and 803.4 of the cross correlation circuits 802.3 and 802.4, respectively (binary number 00110, not depicted). This furthermore means that the five inputs of the adder 804.16 are coupled to the input of the cross correlation circuit 802.1 and the inverted inputs 803.2 to 803.5 of the cross correlation circuits 802.2 to 802.5 (see binary number 01111 in FIG. 8).

The outputs of the adders 804.1 to 804.16 are coupled to the inputs of a comparator circuit 805. 806 denotes various output signals of the adding circuits 804.1 to 804.16, here it was assumed that a switching signal sequence corresponding to 810 is supplied at the input 800.

The operation of the circuit of FIG. 8 will be further illustrated below. A switching signal sequence as indicated with 810 in FIG. 4 is offered at the input 800 and shifted into the delay lines 801.1 to 801.4. The subsequences of sequence 700 (see FIG. 7) or 810 (in FIG. 8), indicated with 701.1 to 700.5 in FIG. 7, and with 1 to 5 in FIG. 8, are cross-correlated in the cross correlation circuits 802.1 to 802.5 with concurrent subsequences which are stored in the cross correlators 802, i. e. subsequence 1 in cross correlator 802.5, subsequence 2 in correlator 802.4, . . . , and subsequence 5 in cross correlator 802.1. At the output of the adder 804.1, a positive peak with a nominated amplitude (as an example equaling 1 or 100%) is thus produced. At the outputs of the other adders, peaks with low amplitude and optionally negative values are generated. As an example, a peak with amplitude 0.6 (60%) is generated at the output of the adder 804.2 (not depicted), because the inverted output of the cross correlation circuit 802.5 is coupled to an input of adder 804.2. At the output of the adder 804.3 (not depicted), a peak with amplitude 0.6 (60%) is generated because the inverted output of the cross correlation circuit 802.4 is coupled to an input of adder 804.3.

At the output of the adder 804.4 (not depicted), a peak with amplitude 0.2 (20%) is generated because the inverted outputs of cross correlation circuits 802.5 and 802.4 are coupled to respective inputs of the adders 804.2 and 804.3, respectively. This manner of calculating the amplitudes of the peaks at the outputs of the adders 804.i is continued until the amplitude at the output of the adder 804.16 (i=16) equals −0,6 (−60%) because the inverted outputs of the cross correlation circuits 802.2 to 802.5 are coupled to the inputs of the adder 802.16.

The amplitudes of the peaks at the outputs of the adders 804.1 to 804.16 are indicated in FIG. 8 with reference numeral 806.

Now supposed a switching signal sequence, as indicated in FIG. 6 with 601, is offered at the input 800 and shifted into the delay lines 801.1 to 801.4. The subsequences of the sequence 601 (not stated in FIG. 6) are cross-correlated in the cross correlation circuits 802.1 to 802.5 with concurrent subsequences which are stored in the cross correlators 802 (indicated with 801 in FIG. 9), i. e. subsequence 1 in cross correlator 802.5, subsequence 2 in correlator 802.4 . . . , and subsequence 5 in cross correlator 802.1. At the output of the adder 804.1, thus a negative peak with a nominated (100%) amplitude is generated. For all other outputs of the adders 804.2 to 804.16, peaks with lower amplitudes are generated, as in the previous example, but with opposed amplitude.

A switching signal sequence, as indicated with 701 in FIG. 7, is offered at the input 800 and shifted into the delay lines 801.1 to 801.4. The subsequences from sequence 701 (see FIGS. 7), 701.1 to 701.5, are cross-correlated in the cross correlation circuits 802.1 to 802.5 with concurrent subsequences of sequence 700 (810 in FIG. 9) which are stored in the cross correlators 802, i. e. subsequence 701.1 in cross correlator 802.5, subsequence 701.2 in cross correlator 802.4, . . . and subsequence 701.5 in cross correlator 802.1. At the output of the adder 804.6, a positive peak with a nominated amplitude (equaling 1 or 100%) is thus produced. At the outputs of the other adders, peaks with a low amplitude and optionally inverted value are generated.

The output signals of the adders 804.1 to 804.16 are evaluated in the comparator circuit 805. The comparator circuit 805 determines at which one of the outputs of the adding circuits 804.1 to 804.16 a peak with nominal amplitude occurs. If at the output of the adder 804.1, a peak with a positive nominal amplitude occurs, it is determined that a switching signal sequence according to 801 (700 in FIG. 7) was detected. As was already described with reference to FIG. 6, a switching signal is "directly" (see 601 in FIG. 6) generated at the output 811. If at the output of the adder 804.1, a peak with negative nominal amplitude occurs, it is determined that a switching signal sequence according to 601 (see FIG. 6) was detected. As was already described with reference to FIG. 6, a switching signal is now generated at the output 811 after a certain period (see Δt in FIG. 6).

One last example. If at the output of the adder 804.6, a peak with a positive nominal amplitude occurs, it is determined that a switching signal sequence according to 701 (see FIG. 7) was detected. As was already described with reference to FIG. 6, now in turn a switching signal is generated at the output 811 after a certain (other) period (Δt2). This period Δt2 equals the time distance between the occurrence of the switching signal sequence 701 and the occurrence of the switching sequence 700 in the array of different switching signal sequences which are included in the information signal.

Figure 9:
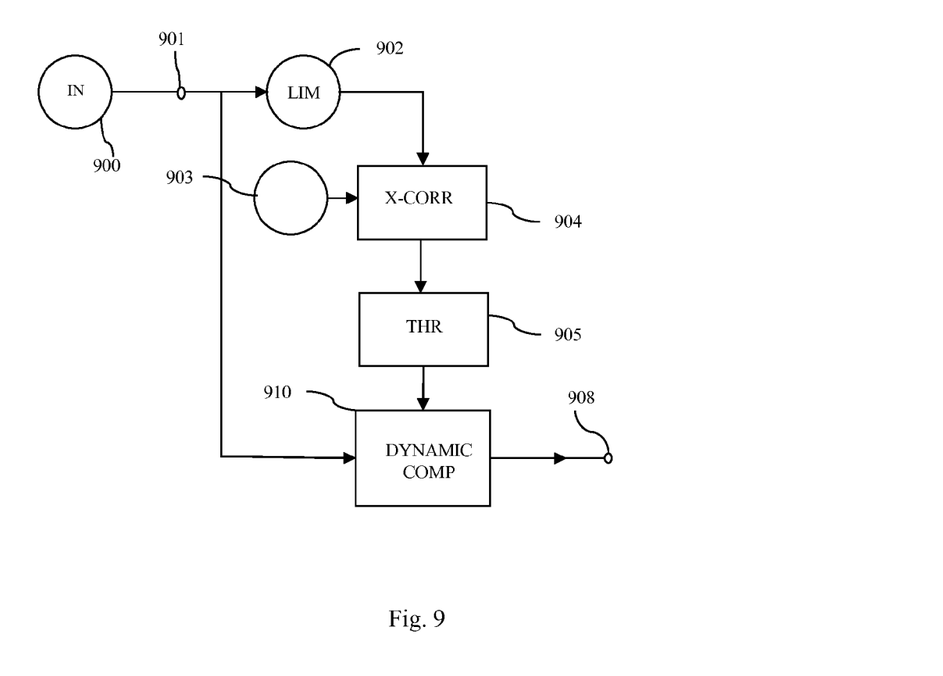
FIG. 9 shows another embodiment of the receiver.

FIG. 9 shows still another example of the receiver of the invention, wherein the detection of the switching signal sequence is here employed for changing the adjustment of a volume compressor or dynamic expander 910 by remote control. The detection in the apparatus of FIG. 9 is identical to that described for the apparatus of FIG. 2. The elements in FIG. 9 indicated with reference numbers 90$x$ work in the same manner as the corresponding elements 20$x$ in FIG. 2. The volume compressor/dynamic expander 910 is provided with a control input for receiving the control signal generated by the threshold circuit 905. A signal input of the compressor/expander 910 is coupled to the input 901 for receiving the information signal.

If a switching signal sequence is detected in the information signal, a control signal is generated by the circuit 905. The volume compressor/dynamic expander 910 will change, under the influence of the control signal, the degree of compression or expansion and offer a more or less compressed or expanded information signal at the output 908.

An enhancement of the switching according to the invention to a different signal source through an changing signal sequence can be seen in the fact, that one can in turn place an x-bit coding in the changing signal sequence, as described above with the help of FIG. 7. For x, e.g. equals 2, those are four different codings. Those different codings can be separately analysed in the cross correlation detector, allowing for a switching to one of the four different sources depending on the corresponding x (02)-bit coding in the switching sequence.

The invention claimed is:

1. An apparatus for including a digital switching signal sequence in a digital information signal, the apparatus comprising:
    a first input for receiving the digital information signal: and
    a second input for receiving the digital switching signal sequence; and
    a signal combination circuit for combining the digital information signal and the digital switching signal sequence, the digital switching signal sequence being built up of a predetermined digitized high-pass filtered white noise signal of predetermined length T, having a cut-off frequency which lies above a frequency where a loudness threshold characteristic in silence of the human hearing has its highest sensitivity, the cut-off frequency of the digitized high-pass filtered white noise signal lying in a frequency region between 4 kHz and 10 kHz,
    wherein the digital switching signal sequence is combined with the digital information signal in response to a trigger moment, wherein the digital switching signal, when detected by a receiver, initiates a switching function in the receiver.

2. The apparatus as claimed in claim 1, wherein the signal combination circuit is further adapted to include a second switching signal sequence in the information signal, the second switching signal sequence being inverted compared to the first switching signal sequence, both switching signal sequences being included in the information signal with a predetermined time distance from each other.

3. The apparatus as claimed in claim 1, wherein the combination circuit is further adapted to include an array of N switching signal sequences in the information signal, where N is an integer for which holds N ≥2, the array of N switching signal sequences being included in the information signal with predetermined time distances from each other, the second and/or higher switching signal sequences having the same amplitude as the first switching signal sequence, the switching signal sequences having been built up in time of M subsequences of preferably equal length, where M is an integer for which holds M ≥2, the second and/or higher switching signal sequences all differing from the first switching signal sequence in that in one or more of the subsequences the amplitude is inverted compared to the amplitude of the corresponding subsequence of the first switching signal sequence.

4. The apparatus as claimed in claim 3, wherein N is larger than 2 and that all of the second and higher switching signal sequences differ from each other in that they have different combinations of inverted subsequences compared to the subsequences of the first switching signal sequence.

5. The apparatus as claimed in claim 1, wherein the combination circuit is adapted to add the digital values of the information signal and a switching signal sequence to each other.

6. The apparatus as claimed in claim 1, wherein the combination circuit is adapted to vary the amplitude of a switching signal sequence in response to varying signal values of the information signal prior to combining the switching signal sequence and the information signal.

7. An apparatus for receiving an information signal which is provided with a digital switching signal sequence, generated by the apparatus as claimed in claim 1, the apparatus being provided with an input for receiving the information signal, a detector circuit for detecting the presence of a switching signal sequence in the information signal and for generating a switching control signal in response thereto, which switching control signal can be used for switching purposes.

8. An apparatus as claimed in claim 7, provided with a switching circuit for switching between the information signal and a second information signal, wherein the switching circuit is adapted to transfer the other of the two information signals in response to the switching control signal.

9. The apparatus as claimed in claim 7, wherein the detector circuit is provided with a cross correlation circuit for cross correlating the received information signal with a stored version of the digital switching signal sequence, which is stored in the detector circuit, and for generating a cross correlation signal in response to a cross correlation step carried out in the cross correlation circuit, and that the detector circuit is adapted to generate the switching control signal in response to a peak in the cross correlation signal exceeding a predetermined threshold.

10. The apparatus as claimed in claim 7, wherein the apparatus is provided with a subtraction circuit for removing a switching signal sequence from the information signal upon detection of the presence of such switching signal sequence in said information signal, the subtraction signal having an output for supplying the information signal which is freed from the switching signal sequence.

11. Apparatus as claimed in claim 1, wherein the cut-off frequency of the digitized high-pass filtered white noise lies in a frequency region between 6 and 8 kHz.

* * * * *